(12) United States Patent
Han (10) Patent No.: US 8,177,673 B2
(45) Date of Patent: May 15, 2012

(54) COMPACT TRANSMISSION PREVENTING A VEHICLE FROM MOVING BACKWARD ON A SLOPE

(75) Inventor: Seung Woo Han, Incheon (KR)

(73) Assignee: Wooyoung Hydraulics Co., Ltd. (KR)

( * ) Notice: Subject to any disclaimer, the term of this patent is extended or adjusted under 35 U.S.C. 154(b) by 538 days.

(21) Appl. No.: 12/310,842

(22) PCT Filed: Sep. 10, 2007

(86) PCT No.: PCT/KR2007/004365
§ 371 (c)(1),
(2), (4) Date: Mar. 10, 2009

(87) PCT Pub. No.: WO2008/032963
PCT Pub. Date: Mar. 20, 2008

(65) Prior Publication Data
US 2009/0312133 A1   Dec. 17, 2009

(30) Foreign Application Priority Data

Sep. 11, 2006 (KR) .......................... 10-2006-0087535

(51) Int. Cl.
*F16H 48/20* (2006.01)
(52) U.S. Cl. ........................................ 475/231; 475/204
(58) Field of Classification Search .................. 475/199, 475/201, 204, 206, 231
See application file for complete search history.

(56) References Cited

U.S. PATENT DOCUMENTS

| | | | |
|---|---|---|---|
| 6,247,566 B1 | 6/2001 | Severinsson | |
| 6,579,204 B2 * | 6/2003 | Brown et al. | 475/204 |
| 6,620,071 B1 * | 9/2003 | Cook et al. | 475/221 |
| 7,798,792 B2 * | 9/2010 | Ronk | 418/171 |
| 7,806,220 B2 * | 10/2010 | Sharma et al. | 180/247 |
| 7,819,771 B2 * | 10/2010 | Nett et al. | 475/204 |
| 2005/0266951 A1 | 12/2005 | Han | |

FOREIGN PATENT DOCUMENTS

| | | |
|---|---|---|
| KR | 10-2004-0002909 | 7/2004 |
| KR | 10-2005-0015918 | 8/2006 |
| KR | 10-0617460 | 8/2006 |
| WO | 2006/090946 | 8/2006 |

* cited by examiner

*Primary Examiner* — Ha D. Ho
(74) *Attorney, Agent, or Firm* — Bacon & Thomas, PLLC

(57) ABSTRACT

A transmission includes a clutch unit having a subsidiary forward clutch part having friction plates coupled to an inner peripheral surface of an axle housing of the clutch unit; a subsidiary coupling coupled to a backward coupling through a one-way bearing; friction disks coupled to an outer peripheral surface of the subsidiary coupling, the friction plates and the friction disks being arranged alternately; and a piston disposed on one side of the friction plates and the friction disks. When a vehicle moves backwardly on an upward slope, an application of hydraulic pressure to the forward clutch part is interrupted and hydraulic pressure is applied to the subsidiary forward clutch part, so that the piston is moved by the hydraulic pressure to compress the friction plates and the friction disks, thereby fixing the subsidiary coupling to the axle housing.

3 Claims, 12 Drawing Sheets

COMPACT TRANSMISSION PREVENTING A VEHICLE FROM MOVING BACKWARD ON A SLOPE

TECHNICAL FIELD

The present invention relates to a transmission used in a motor vehicle, such as a tractor, a special vehicle and a heavy vehicle, exemplified by a forklift truck and an excavators; and, more particularly, to a compact transmission including a subsidiary forward clutch part provided to a clutch unit thereof to prevent the vehicle from moving backward while shifting gears on an upward slope.

BACKGROUND ART

As well known to those skilled in the art, in a power transmission device used in a typical forklift truck, a transmission is provided along with a clutch between a torque converter and an axle shaft. Therefore, conventional power transmissions are problematic in that an engine and the axle shaft become excessively long, and most of the vibration and noise from the engine is undesirably transferred through the transmission to a driver s seat provided in a central portion of a motor vehicle.

Furthermore, in the conventional power transmission devices, a transmission is provided between the engine and a bevel gear unit, which changes the direction of power transmission and conducts gear reduction. Accordingly, excessive shock may occur when shifting the gear, thereby resulting in deterioration of durability of the transmission.

In an effort to overcome the problems experienced with the conventional power transmission devices, the present inventor has proposed a compact transmission (Korean Patent No. 10-0442475 (Korean Patent Application No. 10-2004-02909)), which is provided between a bevel gear unit and a differential gear unit. In this compact transmission, a clutch unit is separated from a wheel reduction gear assembly and is provided between a bevel gear and a differential gear so that it is unnecessary for the bevel gear unit to change its rotational direction in order to change speed. That is, because the bevel gear unit rotates in one direction, noise and vibration are markedly decreased, and the number of elements constituting the transmission is reduced. Thereby, the weight and manufacturing costs are reduced.

Figure 1:
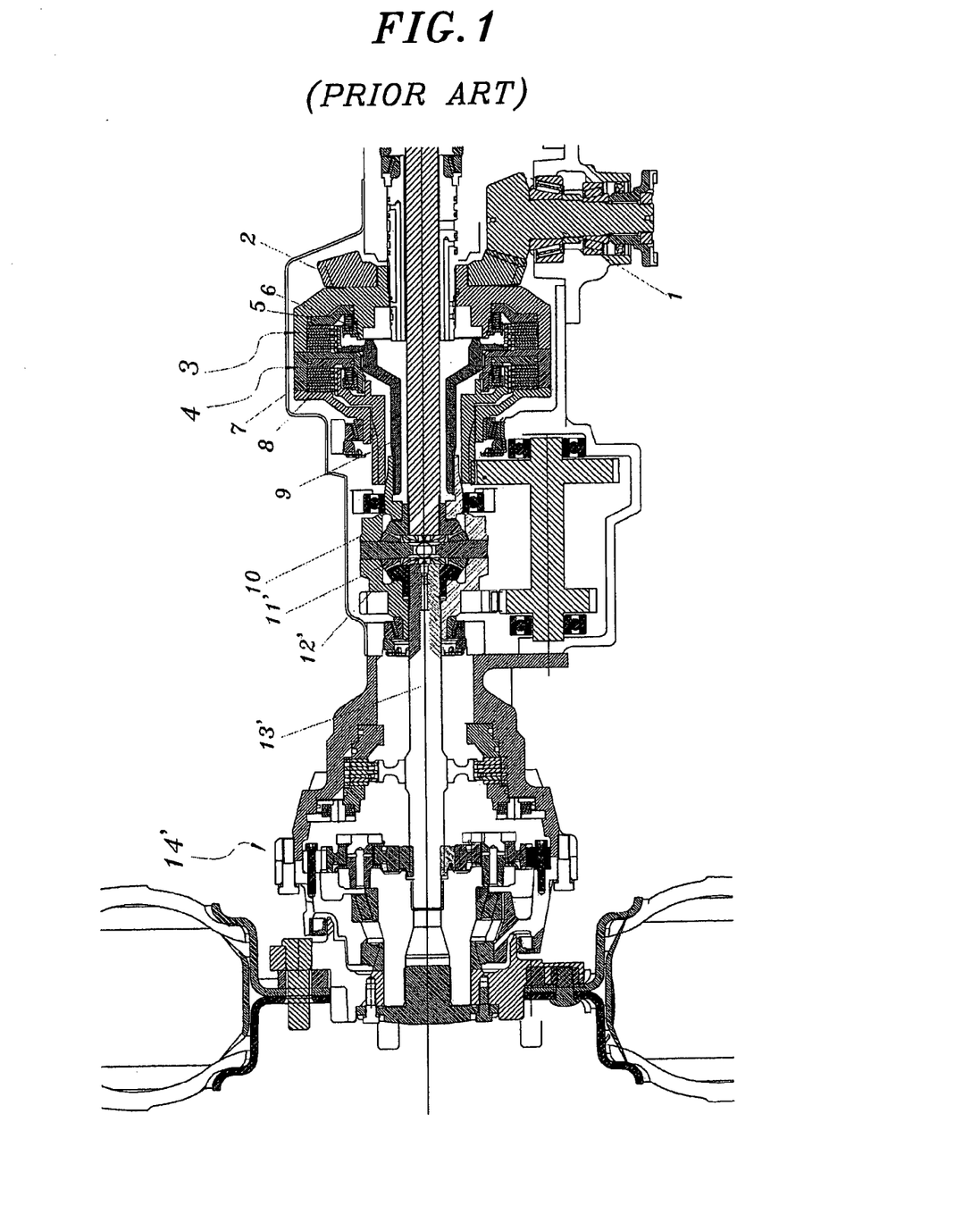
FIG. 1 is a sectional view showing a conventional transmission.

The compact transmission of Korean Patent No. 10-0442475 will now be described in detail with reference to FIG. 1. As shown in FIG. 1, power generated from the engine of a vehicle is perpendicularly transmitted through a bevel gear unit having both a bevel pinion gear and a bevel ring gear 2. The power is transmitted from the bevel ring gear 2 to a clutch unit which includes a forward clutch part 3 to be connected for forward driving of the vehicle, and a backward clutch part 4 to be connected for backward driving of the vehicle.

The power is transmitted from the clutch to a differential gear casing 10 through the forward clutch part 3 or the backward clutch part 4. The differential gear casing 10 has a differential pinion gear 11 and a differential side gear 12. The differential gear casing 10 is coupled to a main drive shaft 13 and transmits the power to the main drive shaft 13. The main drive shaft 13 is coupled to a reduction gear assembly 14 and transmits the power to the reduction gear assembly 14. Thus, the vehicle moves forwards or backwards.

Each of the forward and backward clutch parts 3 and 4 includes a clutch drum 7, a cylinder which is provided in the clutch drum 7, and a piston 5 which is provided at a predetermined position in the cylinder to be movable by hydraulic pressure of hydraulic oil. Each of the forward and backward clutch parts 3 and 4 further includes a spring 6 which supports the piston 5, and a clutch pack 8 which is coupled to both the inner peripheral surface of the clutch drum 7 and the outer peripheral surface of a coupling 9.

However, in the case of a heavy vehicle with the conventional compact transmission having the above-mentioned construction, when the heavy vehicle is momentarily stopped, using a brake, on an upward slope or when a subsequent operation is conducted in the stopped state on the upward slope, the hydraulic pressure, which has been applied to the forward clutch part, is interrupted because of limited engine output, and the above purpose must be achieved using additional power supplied from the engine.

Furthermore, to restart the vehicle from the stopped state on the upward slope, hydraulic oil must be supplied into the forward clutch part 3 to move the piston 5 in a predetermined direction, thus compressing the clutch pack 8 so that power is transmitted from the engine to the main drive shaft 13.

However, until the pressure of the hydraulic oil supplied into the clutch unit becomes sufficient to transmit power from the engine to the main drive shaft 13, the heavy vehicle moves backwards on the upward slope due to the gravity. Furthermore, to move the backward-moving heavy vehicle forwards on the upward slope, high engine output is required. Therefore, the conventional compact transmission is problematic in that fuel consumption is excessively increased, and because great load is applied to the elements constituting the transmission, the lifetime of the transmission is reduced.

In order to solve the aforementioned problems, the present inventor has developed a compact transmission disclosed in Korean Patent No. 10-0687300 (Korean Patent Application No. 10-2005-0015918).

Figure 2:
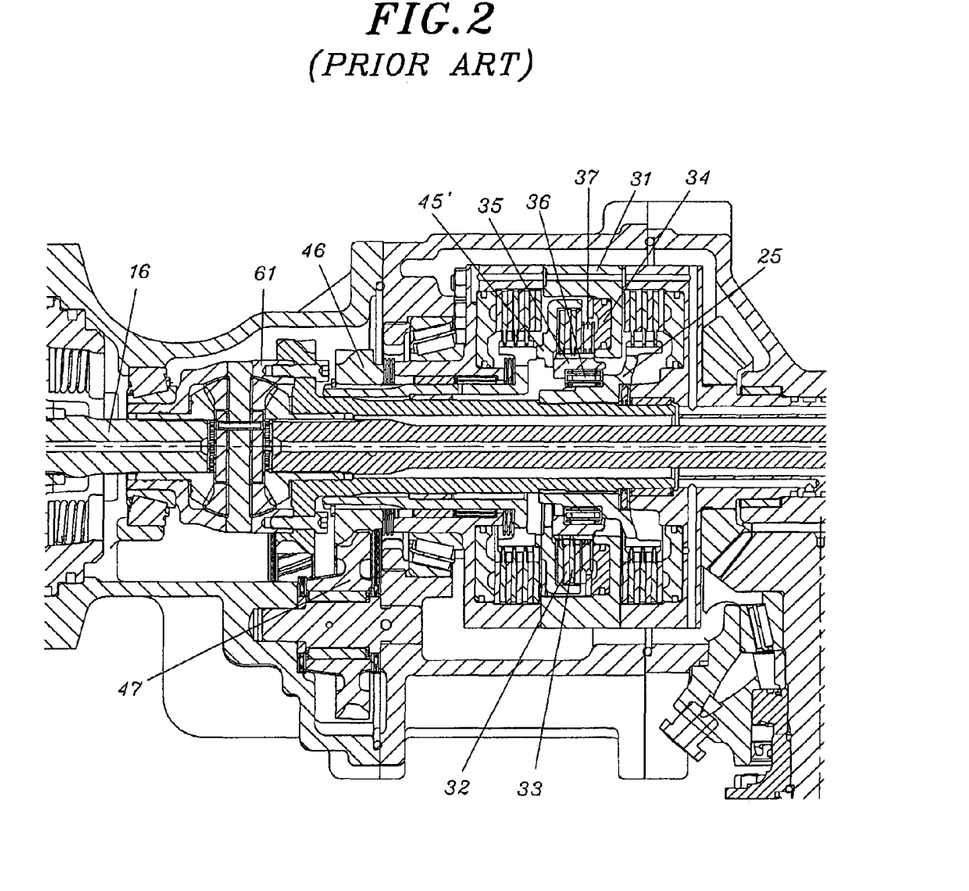
FIG. 2 is a sectional view showing a clutch unit of another conventional transmission, in which a one-way bearing is provided in a subsidiary forward clutch part.

Referring to FIG. 2, the conventional compact transmission including a clutch unit 200 for controlling power transmitted from a bevel gear unit 100 coupled to an output shaft of an engine, the clutch unit having a forward clutch part 20 and a backward clutch part 40. The forward clutch part 20 and the backward clutch part 40 are coupled to a forward drive gear 26 and a backward drive gear 46 through a forward coupling 25 and a backward coupling 45, respectively, and both coupled to a differential gear part 60, so that power is transmitted from the differential gear part through a main drive shaft 16 and an axle assembly to a reduction gear assembly.

The clutch unit 200 further includes a subsidiary forward clutch part 30. The backward coupling 45 extends in a subsidiary clutch drum 31 of the subsidiary forward clutch part 30 and one or more friction plates are coupled to an inner peripheral surface of the backward coupling 45.

A one-way bearing 36 is fitted on an outer peripheral surface of the forward coupling 25 extending in the subsidiary clutch drum 31, and one or more friction disks 33 fitted on an outer peripheral surface of an outer ring 35 of the one-way bearing 33. A piston 34 supported by an elastic means in the subsidiary clutch drum 31 is moved by hydraulic pressure to compress the friction plates 32 and the friction disks 33. Further, a bearing 37 is inserted between the friction plates 32 and the piston 34.

However, in the conventional compact transmission, since the bearing is disposed between the friction plates and the piston, it may be readily broken by the weights of the friction plate, the piston and the like. Accordingly, there is a demand for a transmission including a subsidiary forward clutch part with a simpler structure wherein the bearing between the friction plates and the piston would not be broken.

DISCLOSURE OF INVENTION

Technical Problem

It is, therefore, an object of the present invention to provide a compact transmission in which a subsidiary forward clutch part is provided in a clutch unit, so that, when a vehicle stops at a position on an upward slope, additional hydraulic pressure is applied to the subsidiary forward clutch part before the application of hydraulic pressure to a forward clutch part is interrupted, thereby transmitting a forward power sufficient to prevent the vehicle from moving backwards; and, even when the vehicle restarts, hydraulic pressure is supplied to both the forward clutch part and the subsidiary forward clutch part, thereby significantly reducing gear shifting shock.

Another object of the present invention is to provide a compact transmission having a subsidiary forward clutch part with a simpler structure in which no bearing is provided between a friction plate and a piston, thereby simplifying the manufacturing process thereof, decreasing the costs thereof and making the operation process simple to decrease the possibility of malfunction.

Technical Solution

In accordance with an aspect of the present invention, there is provided a compact transmission including a clutch unit for controlling power transmitted from a bevel gear unit coupled to an output shaft of an engine, the clutch unit having a forward clutch part and a backward clutch part which are respectively to a forward drive gear and a backward drive gear through a forward coupling and a backward coupling and then to a differential gear part, so that power is transmitted from the differential gear part through a main drive shaft and an axle assembly to a reduction gear assembly, wherein the clutch unit further has a subsidiary forward clutch part including one or more friction plates coupled to an inner peripheral surface of an axle housing of the clutch unit; a subsidiary coupling coupled to the backward coupling through a one-way bearing; one or more friction disks coupled to an outer peripheral surface of the subsidiary coupling, the friction plates and the friction disks being arranged alternately; and a piston disposed on one side of the friction plates and the friction disks.

Wherein, when a vehicle moves backwardly on an upward slope while it is driven forwardly, an application of hydraulic pressure to the forward clutch part is interrupted and hydraulic pressure is applied to the subsidiary forward clutch part, so that the piston is moved by the hydraulic pressure to compress the friction plates and the friction disks, thereby fixing the subsidiary coupling to the axle housing.

The reduction gear assembly may includes: a first sun gear coupled to the main drive gear; a plurality of first planetary gears engaged with both the first sun gear and a first ring gear fastened to the axle assembly; a first carrier shaft coupled to the first planetary gears; a second sun gear coupled to the first carrier shaft; a plurality of second planetary gears engaged with both the second sun gear and a second ring gear fastened to the axle assembly; and a second carrier shaft coupled to the second planetary gears, so that power is transmitted to a wheel of the vehicle at a reduced speed.

The axle assembly may include a hydraulic brake assembly and a parking brake assembly. The hydraulic brake assembly has a brake coupling splined to the main drive shaft; one or more frictional brake disks coupled to an outer peripheral surface of the brake coupling; one or more frictional brake plates fastened to an axle housing, the frictional brake disks and the frictional brake plates being alternately arranged while being spaced apart from each other; a first brake piston serving to compress the frictional brake disk and the frictional brake plate by hydraulic pressure; and a restoring spring to provide a restoring force to the first brake piston. The parking brake assembly has a parking brake piston to compress the frictional brake disk and the frictional brake plates; and a second spring for elastically supporting the parking brake piston.

Advantageous Effects

In the transmission in accordance with the present invention, the subsidiary forward clutch part is provided in the clutch part so that, when the vehicle stops on an upward slope, additional hydraulic pressure is applied to the subsidiary forward clutch part before the application of hydraulic pressure to the forward clutch part is interrupted. Accordingly, a forward power sufficient to prevent the vehicle from moving backwards is transmitted to the wheels of the vehicle; and, when the vehicle restarts, hydraulic pressure is supplied to both the forward clutch part and the subsidiary forward clutch part, thereby significantly reducing gear shifting shock.

Further, the subsidiary forward clutch part is constructed with a simpler structure in which no bearing is provided between the friction plates and the piston, thereby simplifying the manufacturing process thereof, decreasing the costs thereof and making the operation process simple to decrease the possibility of malfunction. Moreover, the subsidiary coupling coupled to the one-way bearing is constructed such that it can be engaged to or released from the axle housing. Accordingly, it is possible to prevent the vehicle from moving backward on the upward slope more reliably.

Furthermore, the present invention provides a semi-permanent brake system in which the hydraulic brake assembly and the parking brake assembly are mounted to the axle housing, unlike a conventional drum brake. Therefore, even if an engine is abnormally stopped while the vehicle travels, the parking brake is automatically operated to brake the vehicle, thereby increasing the safety of the vehicle. As well, the vehicle can be parked more safely.

BRIEF DESCRIPTION OF THE DRAWINGS

The above and other objects and features of the present invention will become apparent from the following description of embodiments given in conjunction with the accompanying drawings, in which.

BEST MODE FOR CARRYING OUT THE INVENTION

Hereinafter, an embodiment of the present invention will be described in detail with reference to the accompanying drawings.

Figure 3:
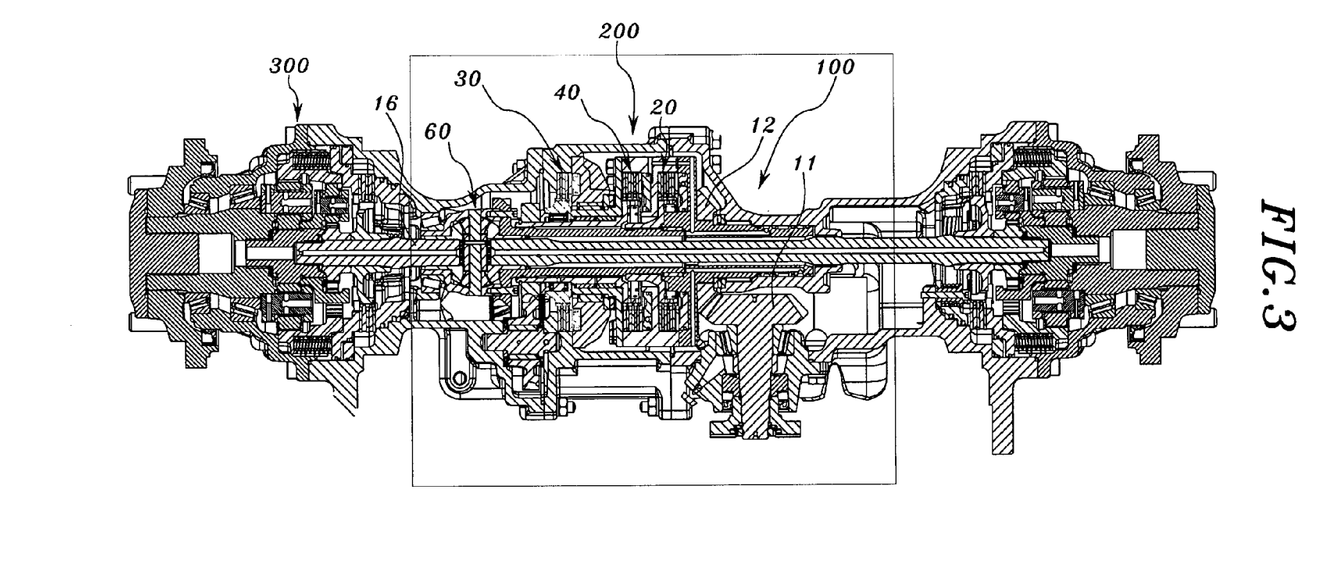
FIG. 3 is a sectional view showing a clutch unit, a differential gear part and a reduction gear assembly of a compact transmission in accordance with an embodiment of the present invention.

FIG. 3 is a sectional view showing a clutch unit, a differential gear part and a reduction gear assembly of a compact transmission in accordance with the embodiment of the present invention.

Referring to FIG. 3, the compact transmission of the present invention receives power from a bevel gear unit 100 and changes the rotational speed of the power by using a clutch unit 200 which is perpendicularly coupled to the bevel gear unit 100. The power is then transmitted from the clutch unit 200 to a main drive shaft 16 through a differential gear part 60 which is coupled to the clutch unit 200. Thereafter, the power is transmitted from the main drive shaft 16 to wheels through an axle assembly 300 at reduced speed.

Figure 4:
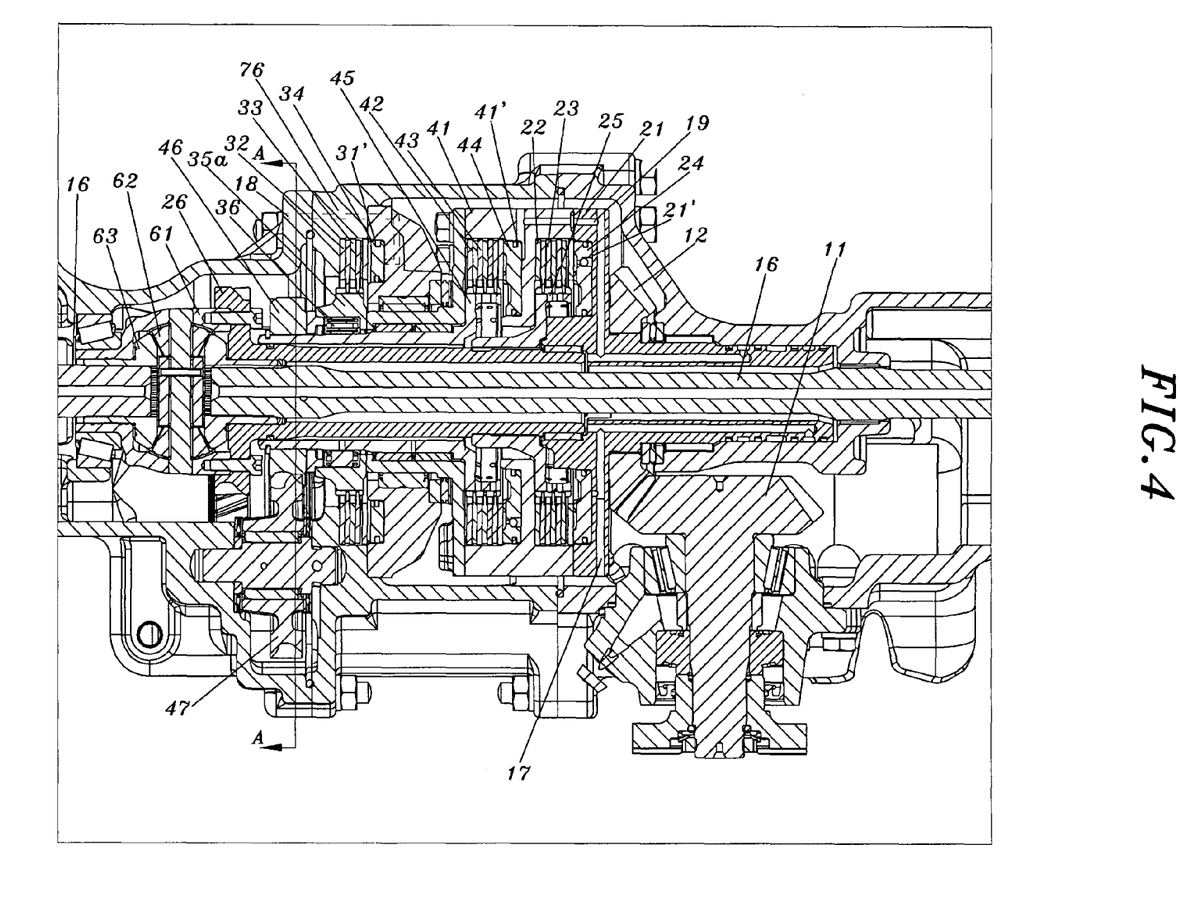
FIG. 4 is an enlarged sectional view of the clutch unit shown in FIG. 3.

FIG. 4 is an enlarged sectional view showing the clutch unit 200 and the differential gear part 60.

Referring to FIG. 4, the bevel gear unit 100 includes a bevel pinion gear 11 which transmits power, generated from an engine, to the clutch unit 200. The bevel gear unit 100 further includes a bevel ring gear 12 which engages with the bevel pinion gear 11 such that the power is transmitted from the bevel pinion gear to the bevel ring gear 12 in a perpendicular direction.

The clutch unit 200 includes a forward clutch part 20, a subsidiary forward clutch part 20 and a backward clutch part 40.

The forward clutch part 20 has a forward clutch drum 21, a forward coupling 25, a piston 24 and an elastic means (now shown).

The forward clutch drum 21 is integrally connected to the bevel ring gear 12 and is disposed inside an axle housing 76. One or more friction plates 22 are coupled to an inner peripheral surface of the forward clutch drum 21. The forward coupling 25 is provided in the forward clutch drum 21 and one or more friction disks 23 are coupled to an outer peripheral surface of the forward coupling 25. The friction plates 22 and the friction disks 23 are alternately arranged.

The piston 24 is provided in a cylinder 21 formed at a predetermined position in the forward clutch drum 21 on one side of the friction plates 22 and the friction disks 23. The piston 24 is moved in the cylinder 21 to the left by hydraulic oil moving along an oil flow passage 17 connected to the forward clutch drum 21, thus compressing the friction plates 22 and the friction disks 23. The elastic means is connected to one side of the piston 24 to provide restoring force to the piston 24.

The backward clutch part 40 has a backward clutch drum 41, a backward coupling 45, a piston 44 and an elastic means (now shown).

The backward clutch drum 41 is located on one side of the forward clutch drum 21 in the axle housing 76. One or more friction plates 42 are coupled to an inner peripheral surface of the backward clutch drum 41. The backward coupling 45 is provided in the backward clutch drum 41 and one or more friction disks 43 are coupled to an outer peripheral surface of the backward coupling 45. The friction plates 42 and the friction disks 43 are alternately arranged.

The piston 44 is provided in a cylinder 41 formed at a predetermined position in the backward clutch drum 41 on one side of the friction plates 42 and the friction disks 43. The piston 44 is moved in the cylinder 41 to the left by hydraulic oil moving along an oil flow passage 19 connected to the backward clutch drum 41, thus compressing the friction plates 42 and the friction disks 43. The elastic means is connected to one side of the piston 44 to provide restoring force to the piston 44.

The subsidiary forward clutch part 30 has one or more friction plates 32, one or more friction disks 33, a subsidiary coupling 35a, a one-way bearing 36 and a piston 34.

The friction plates 32 are coupled to an inner peripheral surface of the axle housing 76 of the clutch unit 200. The friction plates 32 and the friction disks 33 are alternately arranged, and the subsidiary coupling 35a is connected to an inner periphery of the friction disks 33. The subsidiary coupling 35a is an element corresponding to an outer ring 35 of a one-way bearing shown in FIG. 2.

The forward coupling 25 is preferably splined to a forward drive gear 26. Accordingly, the forward coupling 25 and the forward drive gear 26 rotate together. Further, the forward drive gear 26 is coupled to a differential gear casing 61 by locking bolts so that the differential gear casing 61 rotates together with the forward drive gear 26.

A differential pinion gear 62 is coupled to the differential gear casing 61 and rotates along with the differential gear casing 61. The differential pinion gear 62 engages with a differential side gear 63 which is splined to the main drive shaft 16 and rotates together with the main drive shaft 16.

The forward drive gear 26, which rotates together with the differential gear casing 61, transmits power from the forward coupling 25 to the main drive shaft 16 through the differential pinion gear 62 and differential side gear 63.

The friction disks 43 of the backward clutch part 40 are coupled to the outer peripheral surface of the backward coupling 45. The backward coupling 45 is splined to a backward drive gear 46.

Figure 5:
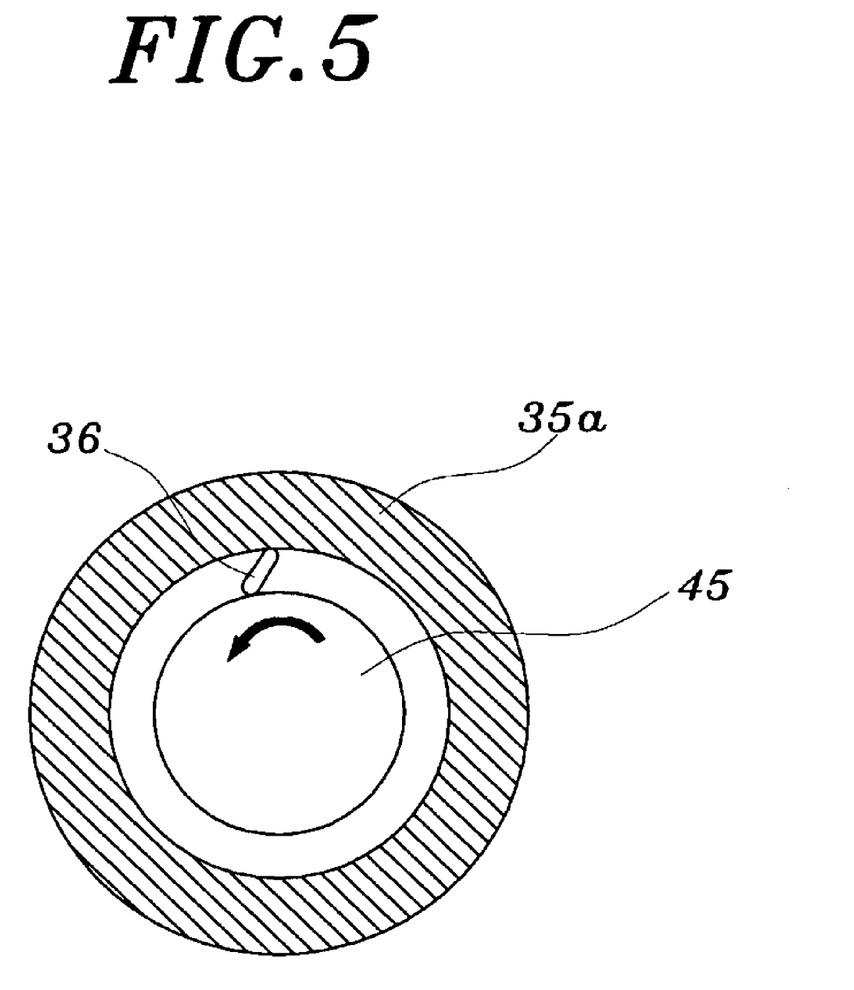
FIG. 5 is a sectional view showing a one-way bearing of a subsidiary forward clutch part in accordance with the present invention.

As shown in FIG. 5, the one-way bearing 36 is disposed between the subsidiary coupling 35a and the backward coupling 45.

Furthermore, the piston 34 is located on one side of the friction plates 32 and the friction disks 33. The piston 34 is moved in a cylinder 31 to the left by hydraulic oil moving along an oil flow passage 18 (indicated by the broken line in FIG. 4) connected to one side of the axle housing 76, thus compressing the friction plates 32 and the friction disks 33. The elastic means is connected to one side of the piston 34 to provide restoring force to the piston 34.

Figure 6:
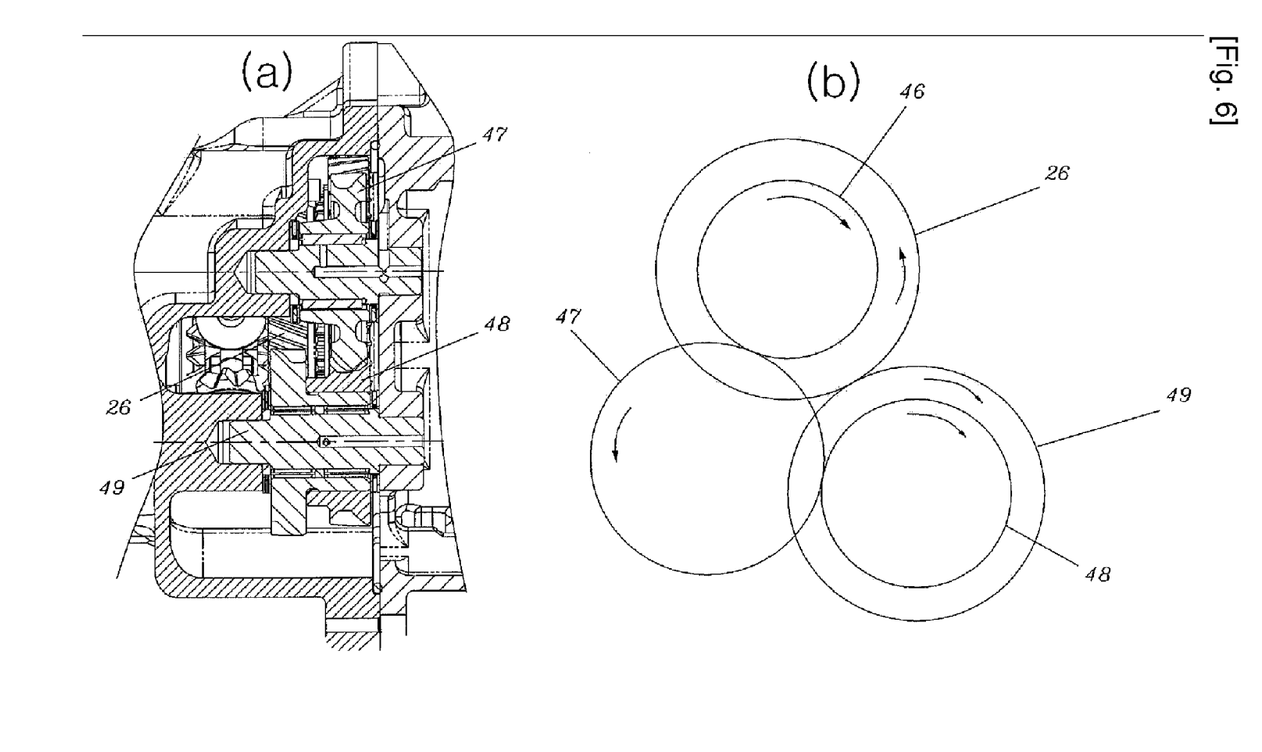
FIG. 6(a) is a sectional view showing the coupling structure among an idle gear, a counter gear and a forward drive gear in accordance with the present invention taken along the line A-A in FIG. 4.
FIG. 6(b) is a schematic diagram showing operation state thereof.

FIG. 6(a) is a sectional view showing the coupling structure among an idle gear, a counter gear and a forward drive gear in accordance with the present invention taken along the line A-A in FIG. 4, and FIG. 6(b) is a schematic diagram showing operation state thereof;

Referring to FIGS. 6(a) and 6(b), when the backward drive gear 46 rotates clockwise, the idle gear 47 engaged with the backward drive gear 46 rotates counterclockwise, and both the first counter gear 48 engaged with the idle gear 47 and the second counter gear 49 integrated with the first counter gear 48 rotate clockwise.

Then, the forward drive gear 26 engaged with the second counter gear 49 rotates counterclockwise, and differential gear casing coupled to the forward drive gear by the locking bolts also rotates counterclockwise. The differential pinion gear 62 coupled to the differential gear casing 61 rotates counterclockwise together therewith.

Therefore, the main drive shaft 16 splined to the differential side gear 63 also rotates counterclockwise. As a result, the vehicle is driven backwards due to the counterclockwise rotation of the main drive shaft 16.

The operation of the transmission constructed as described above will now be described.

Figure 7:
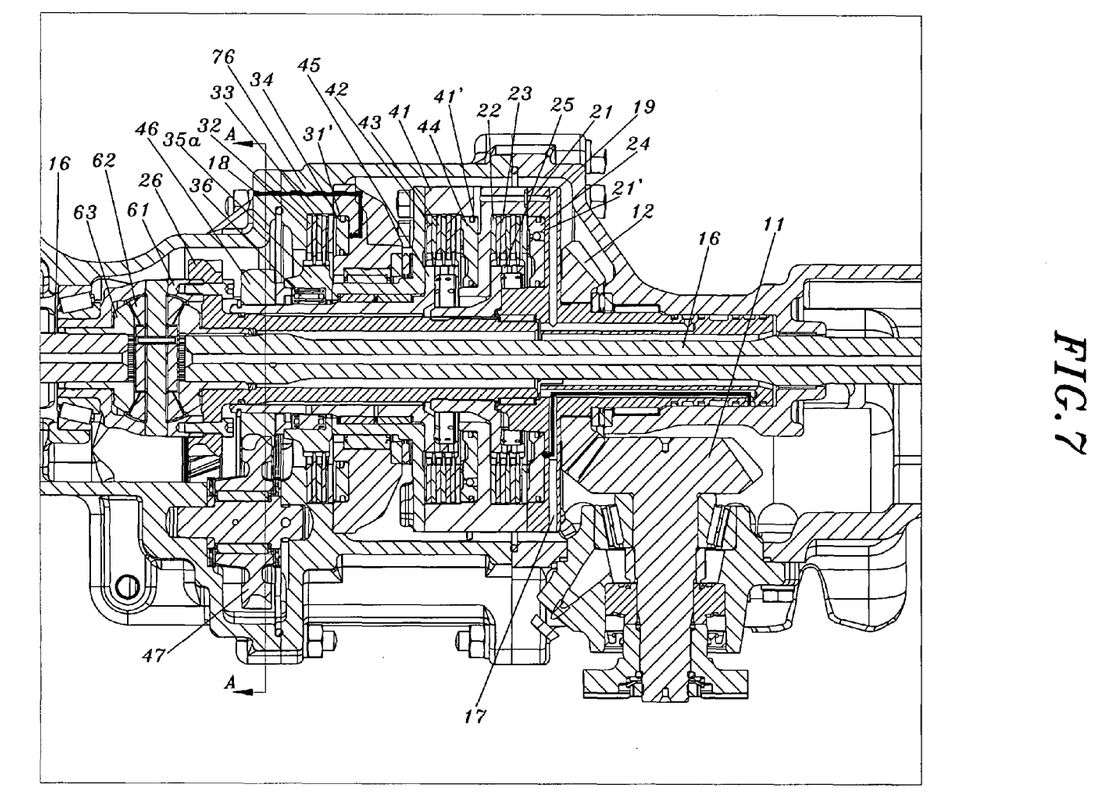
FIG. 7 is a sectional view showing a power transmitting path of the transmission in accordance with the present invention when a vehicle is forwardly driven.

FIG. 7 is a sectional view showing a power transmitting path of the transmission in accordance with the present invention when the vehicle is forwardly driven.

Referring to FIG. 7, when the vehicle is forwardly driven, rotational power of the engine is transmitted to the bevel ring gear 12 through the bevel pinion gear 11. Then, the power is transmitted to the clutch unit 200 which is integrated with the bevel ring gear 12. In this embodiment, the bevel pinion gear 11 rotates clockwise and the bevel ring gear 12 engaged with the bevel pinion gear 11 also rotates clockwise to transmit the rotational power to the clutch unit 200.

Upon the forward driving of the vehicle, hydraulic pressure is applied to both the forward clutch part 20 and the subsidiary forward clutch part 30.

When hydraulic pressure is applied to the forward clutch part 20, the piston 24 is moved to compress the friction plates 22 and the friction disks 23. Accordingly, the friction plates 22 and the friction disks 23 are in close contact with each other so that rotating force of the forward clutch drum 21 is transmitted to the forward coupling 25. As a result, the forward coupling 25 rotates clockwise.

Then, the forward drive gear 26 splined to the forward coupling 25 and the differential gear casing 61 bolted to the forward drive gear 26 also rotate clockwise.

As the differential pinion gear 62 integrated with the differential gear casing 61 rotates clockwise, the differential side gear 63 also rotates clockwise, so that the main drive shaft 16 splined to the differential side gear 63 rotates clockwise. As a result, the vehicle is driven forwardly.

The second counter gear 49 engaged with the forward drive gear 26 rotates counterclockwise as shown in FIG. 6B, and the first counter gear 48 integrated with the second counter gear 49 also rotates counterclockwise. Then, the idle gear 47 engaged with the first counter gear 48 rotates clockwise, and the backward drive gear 46 engaged with the idle gear 47 rotates counterclockwise.

Meanwhile, when hydraulic pressure is applied to the subsidiary forward clutch part 30, the piston 34 is moved to compress the friction plates 32 and the friction disks 33, thereby fixing the subsidiary coupling 35a to the axle housing 76. Under the condition the subsidiary coupling 35a is fixed, the backward drive gear 46 is over-run while rotating counterclockwise through the one-way bearing.

On the other hand, when no hydraulic pressure is applied to the forward clutch part 20, the friction plates 22 and the friction disks 23 are kept spaced apart from each other, so that the rotating force of the forward clutch drum 21 is not transmitted to the forward drive gear through the forward coupling 25, thereby maintaining an idle state.

Figure 8:
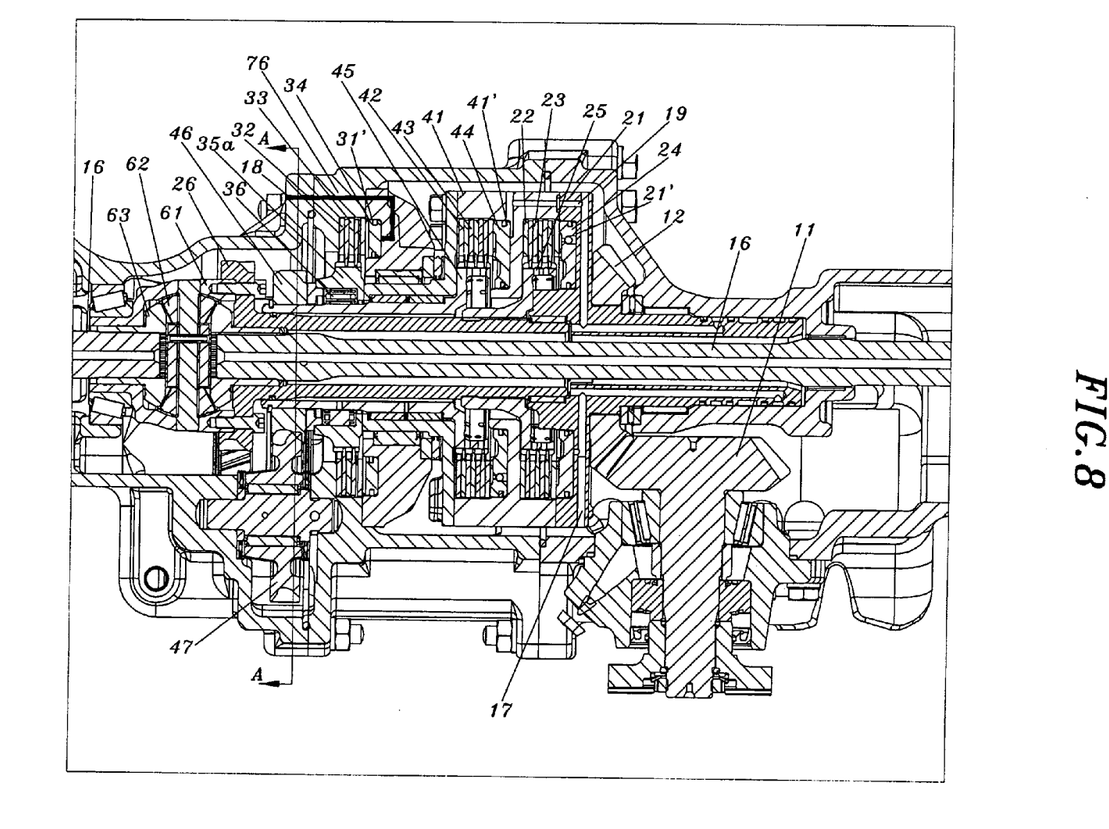
FIG. 8 is a sectional view showing a power transmitting path of the transmission in accordance with the present invention when the vehicle moves backwardly on an upward slope.

FIG. 8 is a sectional view showing a power transmitting path of the transmission in accordance with the present invention when the vehicle moves backwardly.

Referring to FIG. 8, when the vehicle moves backwardly on an upward slope while it is driven forwardly, the application of hydraulic pressure to the forward clutch part 20 is interrupted and the hydraulic pressure is applied to only the subsidiary forward clutch part 30.

When the application of hydraulic pressure to the forward clutch part 20 is interrupted, the piston 24 is returned to allow the friction plates 22 and the friction disks 23 to be separated from each other. Accordingly, the forward clutch drum 21 and the forward coupling 25 are also separated from each other, so that the rotating force of the former is not transferred to the latter. As a result, the rotational force is not transmitted to the forward drive gear 26 splined to the forward coupling 25.

At this time, as the vehicle moves backwardly, the main drive shaft 16 rotates counterclockwise and then the differential side gear 63, the differential pinion gear 62 and the differential gear casing 61 also rotate counterclockwise. Further, the forward drive gear 26 bolted to the differential gear casing 61 also rotates counterclockwise.

The second counter gear 49 engaged with the forward drive gear 26 rotates clockwise as shown in FIG. 6B, and the first counter gear 48 integrated with the second counter gear 49 also rotates clockwise. Then, the idle gear 47 engaged with the first counter gear 48 rotates counterclockwise, and the backward drive gear 46 engaged with the idle gear 47 rotates counterclockwise.

If the application of hydraulic pressure to the subsidiary forward clutch part 30 is continued, the piston 34 still compresses the friction plates 32 and the friction disks 33 to fix the subsidiary coupling 35a to the axle housing 76. Under the condition that the subsidiary coupling 35a is fixed, the counterclockwise rotation of the backward drive gear is blocked by the one-way bearing, so that the vehicle is stopped without moving backwardly.

Figure 9:
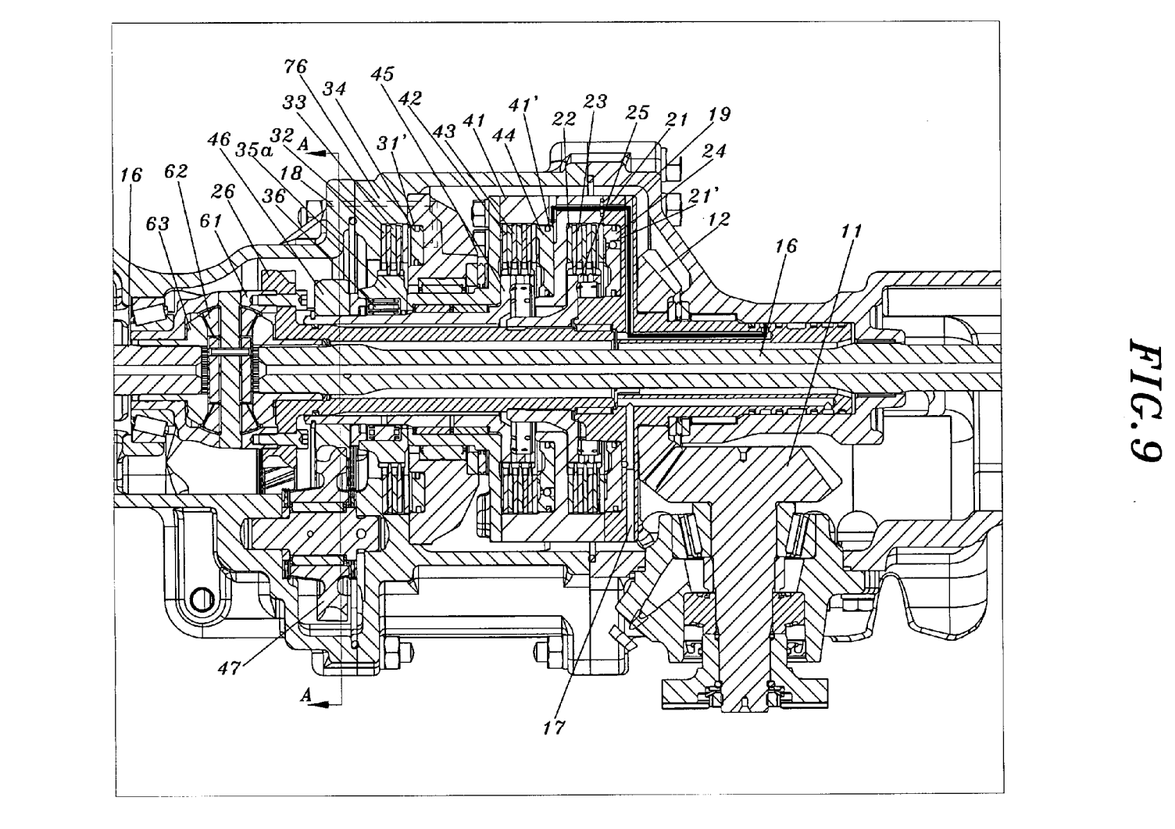
FIG. 9 is a sectional view showing a power transmitting path of the transmission in accordance with the present invention when the vehicle is backwardly driven.

FIG. 9 is a sectional view showing a power transmitting path of the transmission in accordance with the present invention when the vehicle is driven backwardly. The power of the engine is transmitted in the same manner as when the vehicle is driven forwardly.

Referring to FIG. 9, when the vehicle is driven backwardly, hydraulic pressure is applied to the backward clutch part 40 while the application of the hydraulic pressure to the subsidiary forward clutch part 30 is interrupted.

When the hydraulic pressure is applied to the backward clutch part 40, the piston 24 is moved to compress the friction plates 22 and the friction disks 23, so that the rotating force of the backward clutch drum 41 is transmitted to the backward coupling 45 and the backward drive gear 46 integrated with the backward coupling 45.

The backward drive gear 46 rotates clockwise as shown in FIG. 6B and the idle gear 47 rotates counterclockwise. Then, the first and the second counter gear 48, 49 rotate clockwise. As the second counter gear 49 rotates clockwise, the forward drive gear 26 rotates counterclockwise.

When the forward drive gear 26 rotates counterclockwise, the differential gear casing 61, the differential pinion gear 62 and the differential side gear 63, which are sequentially coupled to the forward drive gear 26, rotate counterclockwise. As a result, the main drive shaft 16 splined to the differential side gear 63 rotates counterclockwise, so that the vehicle is driven backwardly.

At this time, if the application of hydraulic pressure to the subsidiary forward clutch part 30 is interrupted, the piston 34 is returned to allow the friction plates 32 and the friction disks 33 to be separated from each other. Accordingly, the subsidiary coupling 35a is released from the axle housing 76. Under this state, even when the backward drive gear 46 rotates clockwise, the clockwise rotation of the backward drive gear is not blocked by the one-way bearing, so that the vehicle is driven backwardly. In this embodiment, the backward coupling 45 and the backward drive gear 46 are integrated with each other, the rotation of the backward coupling 45 leads to the rotation of the backward drive gear 46.

Figure 10:
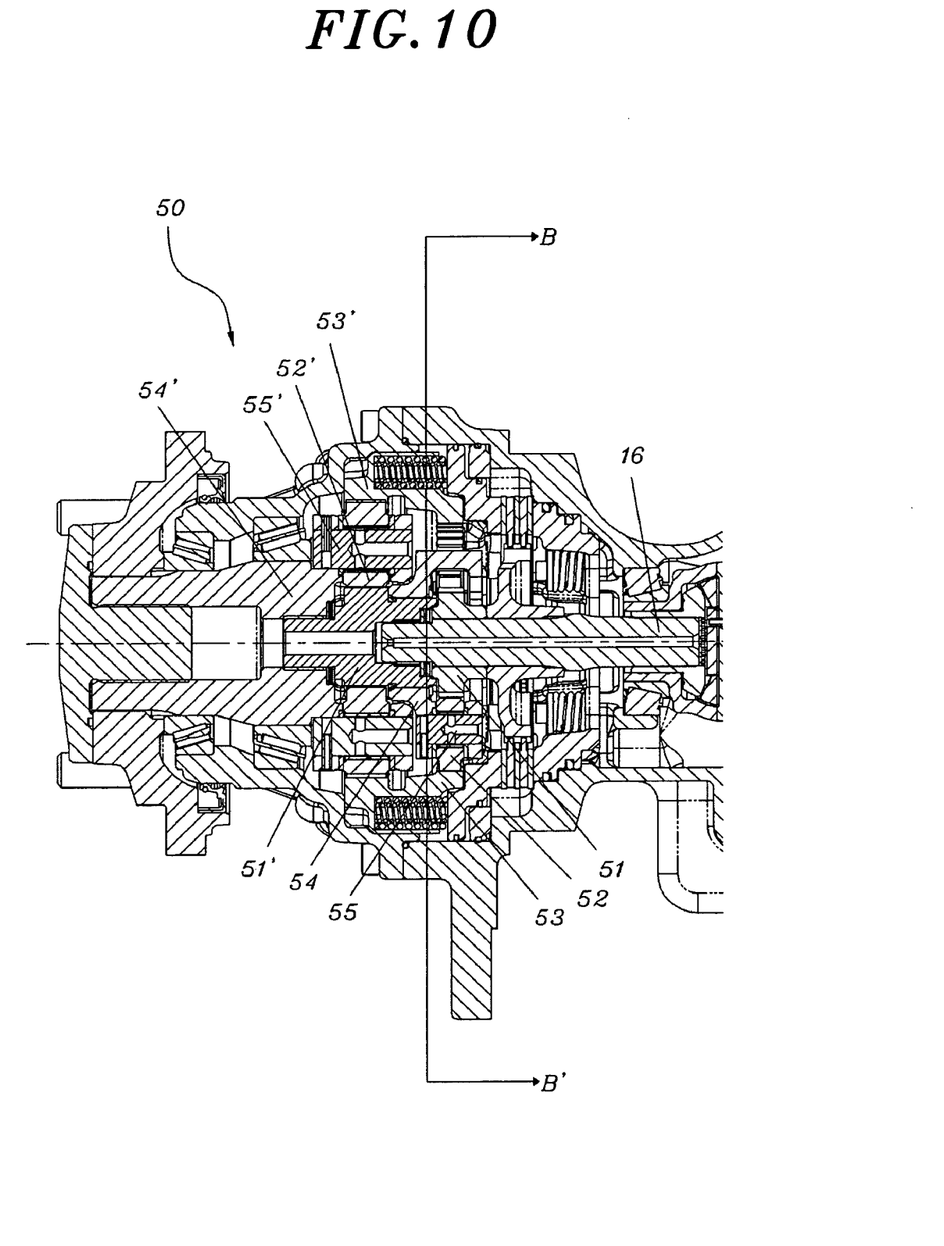
FIG. 10 is sectional view showing the reduction gear assembly provided around a main drive shaft in accordance with the present invention.

FIG. 14 is a sectional view showing the reduction gear assembly 50 coupled to the main drive shaft 16 to drive the vehicle.

In this embodiment, a planetary gear assembly is used as the reduction gear assembly 50. However, the reduction gear assembly 50 is not limited to the planetary gear assembly. In other words, various alternatives, including typical gears, may be employed as the reduction gear assembly 50 as long as they can reduce rotational speed. Such simple modifications are easily made by those skilled in the art, so they may be regarded as being within the scope of the present invention.

The reduction gear assembly 50 reduces the rotational speed of the main drive shaft 16 approximately at a ratio of 13:1 when the vehicle is driven. The rotation of the main drive shaft 16 is transmitted to a first sun gear splined thereto.

The first sun gear 51 engages with a plurality of first planetary gears 52. The planetary gears are engaged with the inner side of a first ring gear 53 which is fixed to the housing of the axle assembly 50. A rotating center shaft 55 of the first planetary gear 52 is integrally coupled to a first carrier shaft 54.

Therefore, the rotation of the engine transmitted to the first sun gear 51 is first reduced in speed by the first planetary gears 52 and is output through the first carrier shaft.

Further, the first carrier shaft 54 is splined to a second sun gear 51 and transmits the rotation of the engine, which was first reduced in speed by the first planetary gears 52, to the second sun gear 51. The second sun gear 51 engages with a plurality of second planetary gears 52. The second planetary gears 52 are coupled to the inner side of a second ring gear 53 which is fixed to the housing of the axle assembly 50. A rotating center shaft 55 of the second planetary gear 52 is integrally coupled to a second carrier shaft 54.

The rotation of the engine, transmitted from the first carrier shaft 54 to the second sun gear 51, is again reduced in speed by the second planetary gears 52 and is output through the second carrier shaft 54. The rotating force, which is output through the second carrier shaft 54, rotates the wheels of the vehicle.

In this embodiment, the first and second ring gears 53 and 53 are formed as a single body and have predetermined shapes such that the first and second planetary gears 53 and 52 engage with the inner peripheral surfaces of the first and the second ring gears 53 and 53, respectively. However, alternatively, the first and second ring gears 53 and 53 may be separately manufactured and coupled to each other by locking bolts.

Figure 11A:
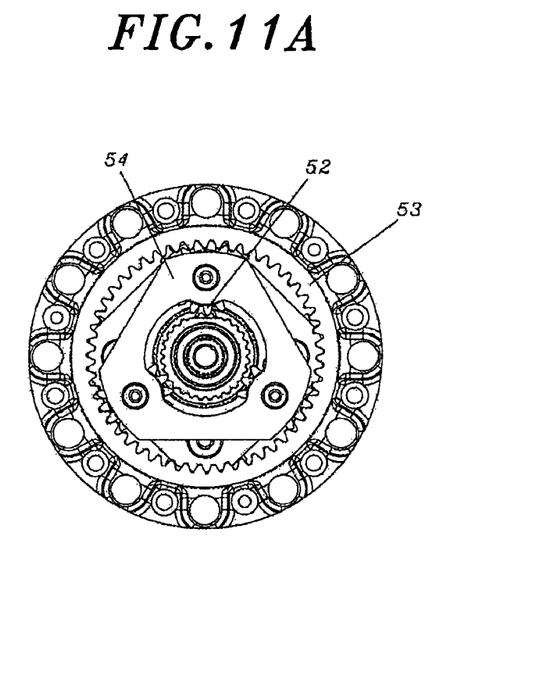
FIG. 11(a) is a sectional view taken along the line B-B of FIG. 10 to show the construction of the reduction gear assembly.
Figure 11B:
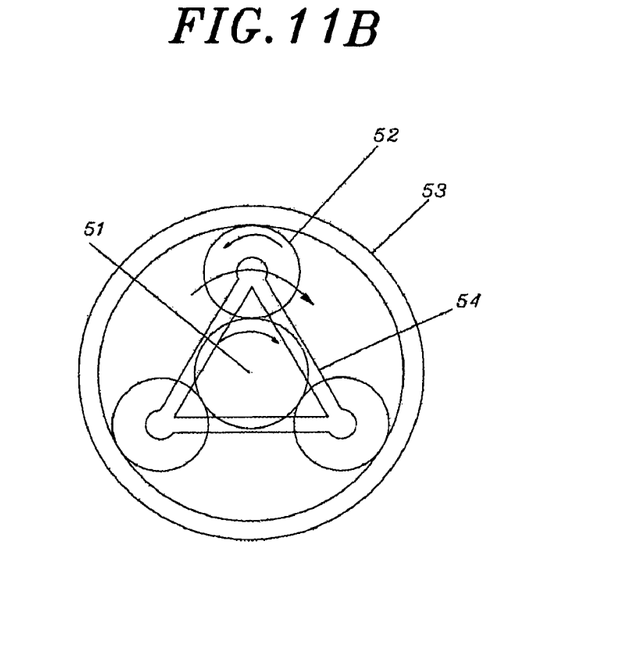
FIG. 11(b) is a schematic view thereof.

FIG. 11(a) is a sectional view taken along the line B-B of FIG. 10 to show the construction of the reduction gear assembly 50, and FIG. 11(b) is a schematic view thereof.

The first and second rotating center shafts 55 and 55 of the first and second planetary gears 52 and 52 are integrated with the first and second carrier shafts 54 and 54, respectively, so that the engine power is transmitted to the wheels of the vehicle by the revolution of the first and second planetary gears 52 and 52.

Figure 12:
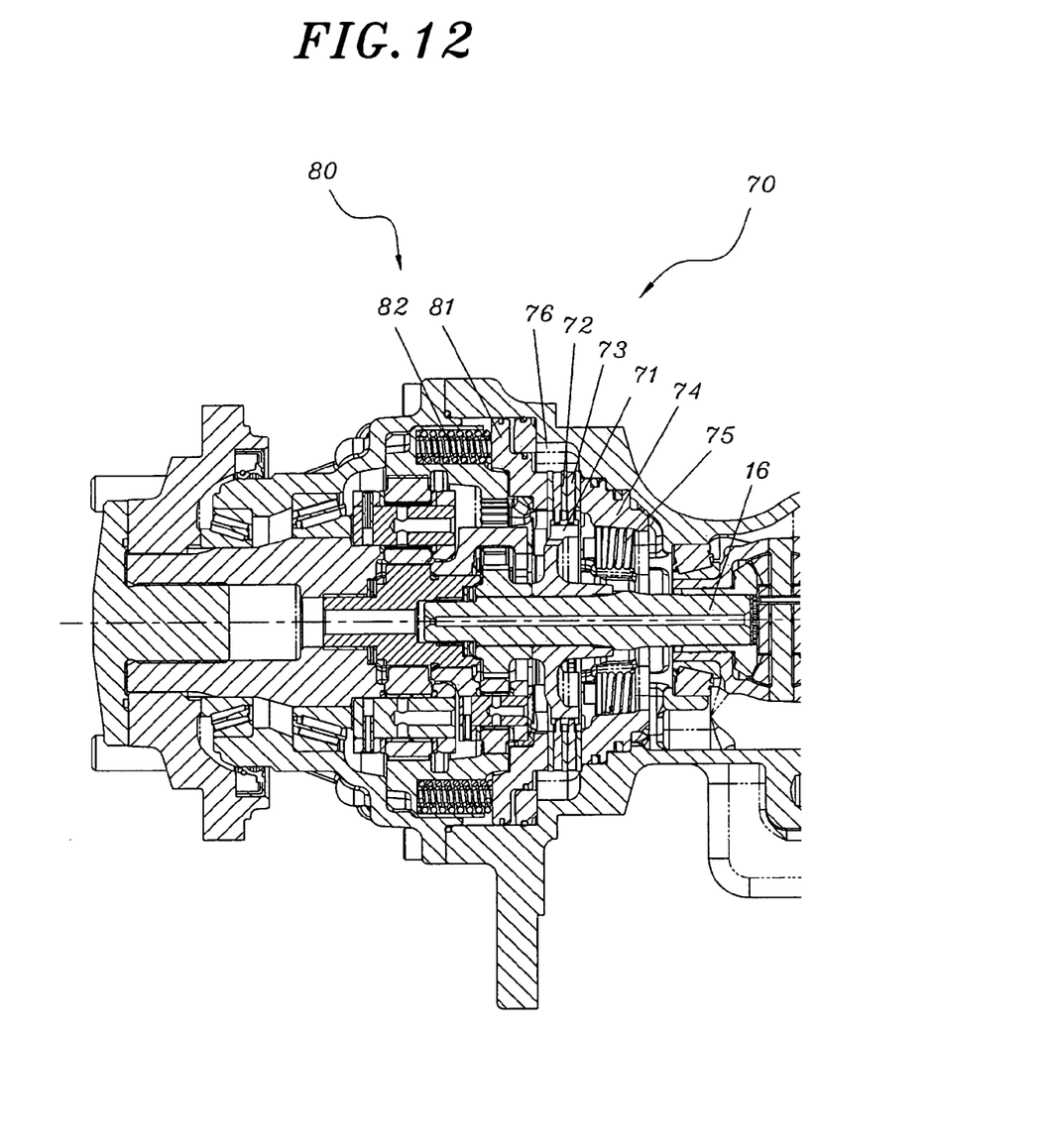
FIG. 12 is a sectional view showing both a hydraulic brake assembly and a parking brake assembly of an axle assembly in accordance with the present invention.

FIG. 12 is a sectional view showing a brake assembly comprising a hydraulic brake assembly 70 for braking the rotation of the main drive shaft 16 and a parking brake assembly 80 for braking the rotation of the main drive shaft 16 while the vehicle is parked.

The hydraulic brake assembly 70 includes a brake coupling 71 which is splined to the main drive shaft 16, a plurality of frictional brake disks 73 which is coupled to the outer peripheral surface of the brake coupling 71, and a plurality of fictional brake plates 72 which are fixed to the axle housing 76. The frictional brake disks 73 and the frictional brake plates 72 are alternately arranged while being spaced apart from each other at regular intervals. The hydraulic brake assembly 70 further includes a brake piston 74 for compressing the frictional brake disks 73 and the frictional brake plates 72 by hydraulic pressure, and a restoring spring 75 which provides restoring force to the first brake piston 74.

When the vehicle travels, the brake coupling 71 splined to the main drive shaft 16 rotates along with the main drive shaft 16, and the frictional brake disks 73 coupled to the outer peripheral surface of the brake coupling 71 also rotates.

To brake the vehicle, hydraulic pressure is applied to the brake piston 74 so that the brake piston 74 moves to the left in FIG. 12. Thus, the brake piston 74 compresses the frictional brake disks 73, which are rotating, and the frictional brake plates 72 fixed to the axle housing 76, so that the rotation of the frictional brake disks is restricted. As a result, the vehicle is stopped.

The parking brake assembly 80 includes a parking brake piston 81 for compressing the frictional brake disks 73 and the frictional brake plates 72, and an elastic spring 82 for biasing the parking brake piston 81.

When the vehicle travels, hydraulic pressure is applied to the parking brake piston 81 so that the latter is moved to the left in FIG. 12 so as not to compress the frictional brake disks 73 and the frictional brake plates 72. However, during parking, the hydraulic pressure is removed from the parking brake piston 81 so that the frictional brake disks 73 and the frictional brake plates 72 are compressed by the parking brake piston 81 due to the elastic force of the elastic spring 82.

As described above, in the transmission in accordance with the present invention, the subsidiary forward clutch part is provided in the clutch part so that, when the vehicle stops on an upward slope, additional hydraulic pressure is applied to the subsidiary forward clutch part before the application of hydraulic pressure to the forward clutch part is interrupted. Accordingly, a forward power sufficient to prevent the vehicle from moving backwards is transmitted to the wheels of the vehicle; and, when the vehicle restarts, hydraulic pressure is supplied to both the forward clutch part and the subsidiary forward clutch part, thereby significantly reducing gear shifting shock.

Further, the subsidiary forward clutch part is constructed with a simpler structure in which no bearing is provided between the friction plates and the piston, thereby simplifying the manufacturing process thereof, decreasing the costs thereof and making the operation process simple to decrease the possibility of malfunction. Moreover, the subsidiary coupling coupled to the one-way bearing is constructed such that it can be engaged to or released from the axle housing. Accordingly, it is possible to prevent the vehicle from moving backward on the upward slope more reliably.

Furthermore, the present invention provides a semi-permanent brake system in which the hydraulic brake assembly and the parking brake assembly are mounted to the axle housing, unlike a conventional drum brake. Therefore, even if an engine is abnormally stopped while the vehicle travels, the parking brake is automatically operated to brake the vehicle, thereby increasing the safety of the vehicle. As well, the vehicle can be parked more safely.

While the invention has been shown and described with respect to the embodiments it will be understood by those skilled in the art that various changes and modifications can be made without departing from the scope of the invention as defined in the following claims.

The invention claimed is:

1. A compact transmission including a clutch unit for controlling power transmitted from a bevel gear unit coupled to an output shaft of an engine, the clutch unit having a forward clutch part and a backward clutch part which are respectively coupled to a forward drive gear and a backward drive gear through a forward coupling and a backward coupling and then to a differential gear part, so that power is transmitted from the differential gear part through a main drive shaft and an axle assembly to a reduction gear assembly, wherein the clutch unit comprising:

a subsidiary forward clutch part including one or more friction plates coupled to an inner peripheral surface of an axle housing of the clutch unit;

a subsidiary coupling coupled to the backward coupling through a one-way bearing;

one or more friction disks coupled to an outer peripheral surface of the subsidiary coupling, the friction plates and the friction disks being arranged alternately; and a piston disposed on one side of the friction plates and the friction disks, wherein, when a vehicle moves backwardly on an upward slope while the vehicle is driven forwardly, an application of hydraulic pressure to the forward clutch part is interrupted and hydraulic pressure is applied to the subsidiary forward clutch part, so that the piston is moved by the hydraulic pressure to compress the friction plates and the friction disks, thereby fixing the subsidiary coupling to the axle housing.

2. The transmission of claim 1, wherein the reduction gear assembly includes:

a first sun gear coupled to the main drive gear; a plurality of first planetary gears engaged with both the first sun gear and a first ring gear fastened to the axle assembly;

a first carrier shaft coupled to the first planetary gears; a second sun gear coupled to the first carrier shaft; a plurality of second planetary gears engaged with both the second sun gear and a second ring gear fastened to the axle assembly; and a second carrier shaft coupled to the second planetary gears, so that power is transmitted to wheels of the vehicle at a reduced speed.

3. The transmission of claim 1, wherein the axle assembly includes:

a hydraulic brake assembly and a parking brake assembly, the hydraulic brake assembly having a brake coupling splined to the main drive shaft;

one or more frictional brake disks coupled to an outer peripheral surface of the brake coupling;

one or more of frictional brake plates fastened to the axle housing, the frictional brake disk and the frictional brake plates being alternately arranged while being spaced apart from each other;

a first brake piston serving to compress the frictional brake disk and the frictional brake plate by hydraulic pressure;

a restoring spring to provide a restoring force to the first brake piston, and the parking brake assembly having a parking brake piston to compress the frictional brake disks and the frictional brake plates; and a second spring for elastically supporting the parking brake piston.

* * * * *